UNITED STATES PATENT OFFICE.

HEINRICH HEIMANN, OF DESSAU, GERMANY, ASSIGNOR TO ACTIEN GESELLSCHAFT FÜR ANILIN FABRIKATION, OF BERLIN, GERMANY.

DYES AND PROCESS OF MAKING SAME.

1,199,697.  Specification of Letters Patent. Patented Sept. 26, 1916.

No Drawing.  Application filed January 21, 1915. Serial No. 3,607.

*To all whom it may concern:*

Be it known that I, HEINRICH HEIMANN, a citizen of the German Empire, residing at Dessau, Germany, my post-office address being Friedrich-Schneider strasse 63, Dessau, Germany, have invented certain new and useful Improvements in Dyes and Processes of Making Same, of which the following is a specification.

It has been found that the azo compounds obtainable by the action of a diazo compound upon an N-ethylarylamin are excellent parent materials for the production of new and valuable sulfurized dyes. In order to obtain such new dyes an azo compound of the class above defined may be heated with sulfur to higher temperatures; thus for instance para-nitrobenzene-azo-ethyl-alpha-naphthylamin when heated with sulfur to higher temperatures yields a dyestuff which is distinguished by a beautiful yellow brown tint and a good fastness. Furthermore a mixture of such an azo compound with an aromatic amin or with a compound yielding such an aromatic amin, and more especially a mixture of such an azo compound with an azo compound of the aromatic series, or a mixture with a nitroamin may be brought into reaction with sulfur thus yielding also very valuable dyes of a beautiful tint and of a good fastness.

The following examples serve to illustrate my invention, the parts being by weight:

(1.) 10 parts of para-nitrobenzene-azo-ethyl-alpha-naphthylamin and 20 parts of sulfur are heated during about 2–6 hours to say 180–250° C. The melt thus obtained is treated with a concentrated aqueous solution of sodium sulfid in order to make the dye soluble; this may be separated as usual and produces on unmordanted cotton a beautiful yellow brown, possessing a good fastness against boiling soap solution and boiling diluted acids. The dye thus obtained is very similar to the product obtainable according to example 4 from a mixture of para-nitrobenzene-azo-ethyl-alpha-naphthylamin with meta-toluylenediamin. In a similar manner new and valuable dyes can be obtained from para-aminobenzene-azo-ethyl-alpha-naphthylamin or from para-aminobenzene-azo-ethyl-beta-naphthylamin; from the former there is obtained a yellow brown, whereas the latter yields a brown yellow.

(2.) 30 parts of benzene-azo-ethyl-alpha-naphthylamin and 20 parts of benzidin are heated together with 100 parts of sulfur; the temperature may be kept during about 4–6 hours at say 180–250° C. and then for further about 1–3 hours to say 260 to 280° C. The dye may be rendered soluble as above; it dyes unmordanted cotton a beautiful deep yellow brown which is fast against boiling soap and boiling diluted acids and which possesses also a very remarkable fastness against the action of a diluted hypochlorite solution.

(3.) A mixture of 30 parts of benzene-azo-ethyl-alpha-naphthylamin, 25 parts of benzene-azo-alpha-naphthylamin and of 100 parts of sulfur is heated during about 3–8 hours to say 180–250° C. The dyestuff after having been made soluble as indicated above produces on unmordanted cotton from a dye-bath containing an alkali metal sulfid beautiful and deep brown-yellow tints of a good fastness to washing and to boiling diluted acids. As to its behavior against the action of diluted hypochlorite solutions it may be stated that it differs essentially from that of the ordinary sulfurized dyes.

(4.) 10 parts of meta-toluylenediamin, 30 parts of para-nitrobenzene-azo-ethyl-alpha-naphthylamin and 60–80 parts of sulfur are heated during about 2–4 hours to say 220–260° C. The melt thus obtained is treated at about 120° C. with crystallized sodium sulfid, say 24 parts of it; from the resulting solution the dye is separated in the usual manner, for instance by introducing a current of air.

The coloring matter thus produced yields on unmordanted cotton a beautiful yellow-brown tint, fast to washing and to boiling diluted acids. In the dry form when pulverized it forms a brown powder, insoluble or nearly insoluble in the usual organic solvents; in concentrated sulfuric acid and in fuming sulfuric acid of 25 per cent. $SO_3$ it dissolves to a brown solution. The dye is easily soluble in an alkali metal sulfid and in an alkaline hydrosulfite solution to a yellow-brown solution.

It is obvious that the present invention is not limited to the foregoing examples or to the details given therein. Thus it may be stated that the shades of the dyes obtainable according to my invention depend also, generally speaking, upon the proportions of the ingredients as well as upon other special conditions of reaction, such as for instance the temperature of reaction and the duration of heating; furthermore the shades and the fastness of the new dyes obtainable according to my invention may be varied by such an alteration of the conditions of reaction, whereas on the other hand in some cases it makes but little difference as to shade and fastness of the dyes whether the respective azo compound of an N-ethylarylamin is treated with sulfur alone or in mixtures with an aromatic amin or with a compound yielding such an amin.

Having now described my invention what I claim is,—

1. New sulfurized dyes, which can be obtained by the action of sulfur upon an azo-compound of an N-ethylarylamin obtainable by the action of an aromatic diazo compound upon an N-ethylarylamin, which new dyes in the dry state and pulverized are dark powders, yielding, generally speaking, brown shades on unmordanted cotton fast to washing and to boiling diluted acids.

2. New sulfurized dyes, which can be obtained by the action of sulfur upon a nitro-azo compound of an N-ethylarylamin, obtainable by the action of an aromatic nitrodiazo compound upon an N-ethylarylamin, which new dyes in the dry state and pulverized are dark powders, yielding, generally speaking, brown shades on unmordanted cotton fast to washing and to boiling diluted acids.

3. New sulfurized dyes, which can be obtained by the action of sulfur upon a nitrobenzene-azo-N-ethylarylamin, obtainable by the action of a nitrodiazobenzene-compound upon an N-ethylarylamin, which new dyes in the dry state and pulverized are dark powders, yielding, generally speaking, brown shades on unmordanted cotton fast to washing and to boiling diluted acids.

4. New sulfurized dyes, which can be obtained by the action of sulfur upon a para-nitrobenzene-azo-N-ethylnaphthylamin, obtainable by the action of para-nitrodiazobenzene upon an N-ethylnaphthylamin, which new dyes in the dry state and pulverized are dark powders, yielding, generally speaking, brown shades on unmordanted cotton fast to washing and to boiling diluted acids.

5. A new sulfurized dye, which can be obtained by the action of sulfur upon para-nitrobenzene-azo-N-ethyl-alpha-naphthylamin, which new dye in the dry state and pulverized forms a brown powder, which is insoluble or nearly insoluble in the usual organic solvents and which dissolves in concentrated sulfuric acid and in fuming sulfuric acid of 25% $SO_3$ to a red brown solution, which is not altered on the addition of aluminium powder, and which new dye is easily soluble in alkali metal sulfid and in an alkaline hydrosulfite solution to a yellow-brown solution, this new dye producing on unmordanted cotton beautiful yellow brown tints fast to washing and to diluted boiling acids.

6. The hereinbefore-described manufacture of new dyes by acting with sulfur upon an azo compound of an N-ethylarylamin, obtainable by the action of an aromatic diazo compound upon an N-ethylarylamin.

7. The hereinbefore-described manufacture of new dyes by acting with sulfur upon a nitro-azo compound of an N-ethylarylamin, obtainable by the action of a nitrodiazo compound upon an N-ethylarylamin.

8. The hereinbefore-described manufacture of new dyes by acting with sulfur upon a nitrobenzene-azo-N-ethylnaphthylamin.

9. The hereinbefore-described manufacture of new dyes by acting with sulfur upon a para-nitrobenzene-azo-N-ethylnaphthylamin.

In testimony whereof I have hereunto set my hand in presence of two subscribing witnesses.

HEINRICH HEIMANN.

Witnesses:
ARTHUR REILLY,
L. OCHLMANN.